United States Patent Office 3,686,026
Patented Aug. 22, 1972

3,686,026
PROCESS FOR FINISHING TEXTILE MATERIALS WHICH CONTAIN WOOL
Karl Schafer, Opladen, and Artur Reischl, Friedrich Reich, and Dieter Dieterich, Leverkusen, Germany, assignors to Farbenfabriken Bayer Aktiengesellschaft, Leverkusen, Germany
No Drawing. Filed Mar. 18, 1970, Ser. No. 20,801
Claims priority, application Germany, Mar. 29, 1969, P 19 16 331.6
Int. Cl. D06m 3/02
U.S. Cl. 117—141                              7 Claims

ABSTRACT OF THE DISCLOSURE

Process for finishing textile materials made of wool or containing wool consisting in treating the textile materials with aqueous liquors which contain self-dispersible isocyanate polyaddition products containing 'onium salt groups and which are free from isocyanate groups and subsequently drying the materials.

---

The present invention relates to a process for finishing textile materials which are made of wool or of fibres which contain wool; more particularly it concerns a process for finishing textile materials made of wool or fibres containing wool which consists in treating the fibre materials with aqueous liquors which contain isocyanate polyaddition products and then drying them. The process is characterized in that isocyanate polyaddition products that are used are self-dispersible and contain 'onium salt groups and are free from isocyanate groups.

The isocyanate polyaddition products used according to the invention which are self-dispersible, contain 'onium salt groups and are free from isocyanate groups are reaction products of:

(A) higher molecular weight compounds of molecular weight 300 to 10,000, preferably 500 to 6000, which contain at least two hydroxyl or carboxyl groups or at least one hydroxyl group and one carboxyl group;
(B) polyisocyanates;
(C) compounds which contain (1) at least one group which is capable of 'oniom salt formation and (2) at least one group which is reactive with isocyanate groups;
(D) compounds which form 'onion salts with the groups which are capable of 'onium salt formation, and, if desired;
(E) low molecular weight compounds which have at least one group which is reactive with isocyanate groups.

(A) The higher molecular weight compounds of molecular weight 300 to 10,000, preferably 500 to 6000, which contain at least two hydroxyl or carboxyl groups or at least one hydroxyl and one carboxyl group are, for example, polythioethers, polyesters, polyester amides, polyamides and, in particular, polyethers.

The polyethers may be, for example, polymerization products of ethylene oxide, propylene oxide, tetrahydrofuran, butylene oxide or copolymerization or graft polymerization products thereof or polyethers which are obtained by condensation of polyhydric alcohols or mixtures thereof or polyethers obtained by alkoxylation of polyhydric alcohols. Liquid polyethers which are synthesized from at least 30% of propylene oxide are particularly preferred.

The polythioethers may be, in particular, condensation products of thiodiglycol with itself and/or with other glycols, dicarboxylic acids, formaldehydes, aminocarboxylic acids or amino alcohols. Depending on the co-component, the products are polythioethers, polythio mixed ether, polythioether esters or polythioether ester amides. These polythioethers which contain hydroxyl and/or carboxyl groups may also be used in the alkylated form or in admixture with alkylating agents.

The polyesters, polyester amides and polyamides may be predominantly linear condensation products which are obtained from polybasic and especially dibasic, saturated or unsaturated carboxylic acids or their anhydrides and polyvalent saturated or unsaturated alcohols, aminoalcohols, diamines, polyamines and mixtures thereof, or they may be polycarbonates. Polyesters of lactones, for example of caprolactone, or of hydroxycarboxylic acids may also be used.

In addition to the above-mentioned types of compounds, polyhydroxyl compounds which contain basic nitrogen atoms, e.g. polyalkoxylated amines, polyamines and aminoalcohols or polyesters or polythioethers which contain alkyl diethanolamine by condensation or polyhydroxyl compounds in which compounds with reactive halogen atoms, e.g. glycerol-α-chlorohydrin, have been incorporated by condensation may also be used. The polyhydroxyl compounds which contain basic nitrogen atoms may also be present in the alkylated form, i.e. the 'onium form. Polyhydroxyl compounds which contain urethane or urea groups as well as natural polyols which may be modified, such as carbohydrates, and hydroxycarboxylic acids such as castor oil, may also be used.

(B) The following are given as examples of polyisocyanates: aliphatic diisocyanates such as tetramethylene diisocyanate and hexamethylene diisocyanate, cycloaliphatic diisocyanates such as cyclohexane-1,4-diisocyanate, 4,4'-dicyclohexylmethane diisocyanate and 2,4- and 2,6-hexahydrotoluylene diisocyanates, araliphatic diisocyanates such as p-xylylene diisocyanate, aromatic diisocyanates such as p-phenylene diisocyanate, 2,4- or 2,6-toluylene diisocyanates, 1-chloromethylphenyl-2,4-diisocyanate, 1-bromomethylphenyl-2,6-diisocyanate, 3,3-bischloromethyl ether - 4,4' - diphenyldiisocyanate; furthermore diisocyanates which contain sulphur, which can be obtained, for example, by reacting 2 mols of hexamethylene diisocyanate with 1 mol of thiodiglycol or dihydroxydihexyl sulphide, and triisocyanates such as the reaction product

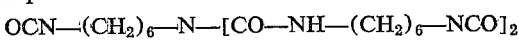
$$OCN-(CH_2)_6-N-[CO-NH-(CH_2)_6-NCO]_2$$

which can be obtained from 3 mols of the hexamethylene diisocyanate and 1 mol of water. Aliphatic and araliphatic polyisocyanates are preferred because the polyaddition products prepared from them do not undergo degradation or discoloration on exposure to light.

(C) The following are given as compounds which contain at least one group capable of 'onium salt formation and at least one group which is reactive with isocyanate groups:

(a) Compounds which have phosphine-type phosphorus atoms and particularly compounds which have amine nitrogen and sulphide sulphur atoms. The following are mentioned as examples of compounds which have amine nitrogen atoms: bis- or poly-hydroxyalkylated aliphatic, cycloaliphatic, aromatic or heterocyclic primary amines such as N-methyldiethanolamine, N-ethyldiethanolamine, N-propyldiethanolamine, N-isopropyldiethanolamine, N-butyldiethanolamine, N-isobutyldiethanolamine, N-oleyldiethanolamine, N - stearyldiethanolamine, hydroxyethylated amine of coconut oil, N-allyldiethanolamine, N-methyldiisopropanolamine, N - ethyldiisopropanolamine, N-propyldiisopropanolamine, N-butyldiisopropanolamine, N - cyclohexyldiisopropanolamine, N,N - dihydroxyethyl aniline, N,N - dihydroxyethyltoluidine, N,N - dihydroxyethyl - α-aminopyridine, N,N'-dihydroxyethyl piperazine, dimethyl-bishydroxyethylhydrazine, N,N'-bis-(β-hydroxyethyl)-N,N'-diethylhexahydro-p-phenylenediamine, N-β-hydroxyethyl piperazine, polyalkoxylated amines such as propoxylated methyldiethanolamine, N-methyl-N,N-bis-3-aminopropylamine, alkoxylated aliphatic, cycloaliphatic, aromatic and heterocyclic secondary amines, e.g. N,N-dimethylethanolamine, N,N - diethylethanolamine, N,N-dibutylethanolamine, 1-dimethylaminopropanol-(2), N,N-methyl - β-hydroxyethyl aniline, N,N-methyl-β-hydroxypropyl aniline, N,N-ethyl-β-hydroxyethyl aniline, N,N-butyl-β-hydroxyethyl aniline, N-hydroxyethyl piperidine, N-hydroxyethyl morpholine, o-hydroxyethyl pyridine, α-hydroxyethyl quinoline, aminoalcohols, as they are obtained e.g. by hydrogenation of addition products of alkylene oxide and acrylonitrile with primary amines, such as N-methyl-N-(3-aminopropyl) - ethanolamine, N-cyclohexyl-N-(3-aminopropyl) - propanol-(2)-amine, N,N-bis-(3-aminopropyl)-ethanolamine, N-3-aminopropyldiethanolamine, polyvalent amines, e.g. N,N-dimethylhydrazine, N,N-dimethylethylene diamine, 1 - diethylamino-4-aminopentane, α-aminopyridine, 3-amino-N-ethylcarbazole, N,N-dimethylpropylene dimaine, N-aminopropyl piperidine, N - aminopropyl-morpholine, N-aminopropylethyleneimine, 1,3 - bis-piperidino-2-aminopropane, 3-amino-1-diethylaminopropane, 4-amino-1-diethylaminopentane, aminocarboxylic acids, e.g. dimethylaminoacetic acid, trimethylamine-tricarboxylic acid, 2-dimethylamino propionic acid, 3,3'-methylimino dipropionic acid, 6-dimethylamino caproic acid, 11-diethylamino undecanoic acid, and 4-dimethyl amino benzoic acid.

The following are given as examples of compounds which contain sulphide type sulphur atoms; thiodiglycol, diisopropanol - (2)-sulphide, dihydroxy-dihexyl sulphide, diamino, dipropyl sulphide, bis - (β - hydroxy-β-phenylethyl) - sulphide, S - methyl-thioglycerol, thiodiglycollic acid, sulphide - β-dipropionic acid, sulphide-α-dibutyric acid, compounds of the type

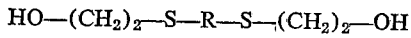

in which R represents a divalent hydrocarbon radical which may also contain hetero atoms.

(b) Compounds which contain ester groups of strong acids or halogen atoms capable of quaternisation reactions, e.g. addition products of hydrogen chloride or other strong acids with unsaturated alcohols, addition products of halo-isocyanates with diols and polyols, aminoalcohols and amino diols such as 2-chloroethanol, 2-bromoethanol, 4-chlorobutanol, 3-bromopropanol, β-chloroethylamine, 6-chlorohexylamine, sulphuric acid ester of ethanolamine, N,N-bis-hydroxyethyl-N'-m-chloromethylphenyl urea, N-hydroxyethyl-N'-chlorohexyl urea, glycerol aminochloroethylurethane, chloroacetyl ethylene diamine, bromoacetyldipropylene triamine, trichloroacetyltriethylene tetramine, glycerol-α-bromohydrin, polypropoxylated glycerol-α-chlorohydrin, polyesters which have aliphatically bound halogen, 1,3 - dichloropropanol - (2), chloroacetic acid, bromoacetic acid, bromosuccinic acid, 1,2-dibromosuccinic acid, chloroaetamide, bromoacetamide, glyerol-α-chlorohydrin, glycerol monotosylate, pentaerythritol-bisbenzenesulphonate, glycerol monomethane sulphonates, addition products of diethanolamine and chloromethylated aromatic isocyanates or aliphatic haloisocyanates such as N,N-bis-hydroxyethyl-N'-m-chloromethylphenyl urea, N-hydroxyethyl-N'-chlorohexyl urea, glycerol monochloroethylurethane, bromoacetyldipropylene triamine and chloreacetic acid diethanolamide.

(D) The following may be used as compounds which form 'onium salts with the groups which are capable of 'onium salt formation:

(a) If the groups capable of 'onium salt formation contain aminotype nitrogen, sulphide-type sulphur or phosphine-type phosphorus atoms; inorganic or organic acids and alkylating agents.

The following are given as examples of inorganic acids: nitric acid, sulphuric acid, polyphosphoric acid, hydroxylamine sulphonic acid and in particular hydrochloric acid, hydrofluoric acid, sulphurous acid, phosphorus acid, phosphoric acid and amidosulphonic acid.

The following are given as examples of organic acids: formic acid, acetic acid, glycollic acid, lactice acid, chloroacetic acid, bromoacetic acid.

The following are given as examples of alkylating agents: monofunctional alkylating agents such as methyl chloride, methyl bromide, methyl iodide, ethyl bromide, propyl bromide, butyl bromide, dimethyl sulphate, diethyl sulphate, methylchloromethyl ether, methyl - 1,2 - dichloroether ether, ethylchloromethyl ether, benzyl chloride, benzyl bromide, p-chlorobenzyl chloride, trichlorobenzyl chloride, p-nitrobenzyl chloride, ethylene chlorohydrin, ethylene bromohydrin, epichlorohydrin, benzene sulphonic acid ester, toluene sulphonic acid ester, naphthalene sulphonic acid ester, α-bromoacetophenone, dinitrochlorobenzene, δ-chloropentenamide, chloroacetic acid and its esters and amides, chloromethyldimethylethoxysilane, pentamethylchloromethyldisiloxane, pentamethylbromomethyldisiloxane, glycol monobromoacetic acid ester, glycerol monochloroacetic acid ester, bromoethyl isocyanate, difunctional or polyfunctional alkylating agents such as 1,4-dibromobutane, methylene-bis-chloroacetamide, p-xylylene dichloride, 1,3 - bis - chloromethyl - 4,6-dimethylbenzene, 1,4 - dichloro - butene, bis - 2 - chloromethylether, bis-chloroacetyl piperazine and hexamethylene-bis-bromoethylurethane;

(b) If the groups capable of 'onium salt formation are reactive chlorine or bromine atoms or sulphonic acid ester groups: mono- and polyamines and mono- and polysulphides.

The following are given as examples of mono- and polyamines: tertiary amines such as trimethylamine, triethylamine, triethanolamine, dimethylaminoethanol, N-methyldiethanolamine, pyridine, quinoline, N-dimethyl-aminopropyldiethanolamine, triethylene diamine, tetramethylethylene diamine, tetramethylhexamethylene diamine and addition products of dimethylaminoethanol or N,N-dimethylpropylene diamine with mono- or poly-isocyanates.

The following are given as examples of mono- and polysulphides: dimethyl sulphide, diethyl sulphide, thiodiglycollic acid, dibutyl sulphide, diisoamyl sulphide, dioctyl sulphide, diallyl sulphide, diisobutenyl sulphide and sulphide-β-dipropionic acid. Thiodiglycol and its condensation products with itself or with other glycols such as triethylene glycol and hexane - 1,6 - diol are particularly preferred.

(E) The following may be used as low molecular weight compounds which have at least one group which is reactive with isocyanate groups:

(a) Bifunctional compounds, saturated and unsaturated glycols such as ethylene glycol or condensates of ethylene glycol, e.g. di-, tri- and tetra-ethylene glycol, butane-1,3-diol, butane-1,4-diol, butenediol, propane-1,2-diol, propane-1,3-diol, neopentyl glycol and hexanediol, aliphatic, cycloaliphatic and aromatic diamines such as ethylene diamine, hexamethylene diamine, 1,4-cyclohexylene diamine, diaminodiphenylmethane and dichlorodiaminodiphenylmethane, amino alcohols such as ethanolamine, propanolamine, butanolamine, N - methylethanolamine, and N-methylisopropanolamine, aliphatic, cycloaliphatic, aromatic and heterocyclic mono-amino and diaminocarboxylic acids such as glycine and 6-aminocaproic acid, water;

(b) Monofunctional compounds, simple alcohols such as methanol, ethanol and glycol monobutyl ether, primary or secondary amines such as butylamine and diethylamine, and monocarboxylic acids such as acetic acid and oleic acid, ureas such as urea, methylurea, thiourea.

The components (A) to (E) may be reacted with each other in any sequence. Preferably, components (A), (B), (C) and, if desired, (E) are first reacted together and the 'onium salt is then formed by the addition of (D). It is advantageous, particularly if polypropylene glycols, which are comparatively inert, are used as component (A), first to react (A) with (B) to form the isocyanate-containing prepolymer and then to react this with (C) and, if desired, with (E). The 'onium salt is formed finally by the addition of (D). On the other hand, it may sometimes be advantageous first to react (B) with (C) (provided this causes no precipitation of sparingly soluble reaction products) and then to react this modified isocyanate mixture with (A).

In principle, (B) and (C) could first be reacted together to form a component (C') which contains 'onium salt groups and this could then be reacted with components (A) and (B) and, if desired, with (E) as described above. This method is, however, generally less satisfactory because low molecular weight salt-type compounds such as (C') are insoluble in (A) and (B). On the other hand, (C) and (D) generally can quite well be added simultaneously or immediately one after the other to a prepolymer formed from (A), (B) and, if desired, (E) so that the 'onium salt is formed in situ.

Another method of procedure consists in using the quaternization or ternization reaction for building up the chain. This is done by using approximately equivalent quantities of components (C), e.g. dimethylaminoethanol, dimethylaminopropanol, methylmercaptoethanol or tetramethyl ethylene diamine, and components (D) for the isocyanate poly-addition. In this case, component (D) must contain not only the group which is capable of 'onium salt formation but also the group which is reactive with isocyanate groups, e.g. bromoethanol or glycol bromoacetate.

The ratio of the isocyanate groups in the polyisocyanates used to the groups which are reactive with isocyanate groups is approximately between 0.8 and 1.2 and is preferably close to 1. If the ratio is greater than 1, care must be taken to ensure that the excess of isocyanate groups undergoes complete reaction when the isocyanate polyaddition products which contain 'onium salt groups are subsequently introduced into the aqueous phase, the reaction of the excess isocyanate groups taking place either by branching with the substituted urea groups present, or by trimerization, or by their reaction with water. In all cases, the aqueous liquor used contains isocyanate polyaddition products which do not contain free or blocked isocyanate groups.

The proportion of higher molecular weight compounds with terminal hydroxyl and/or carboxyl groups (component (A)) to low molecular weight components (E) and (C) may be varied within wide limits. These limits are governed by the requirement that the end product must be sufficiently resistant to water and solvents and must not be too hard because otherwise the handle of the treated textile materials would be adversely affected. This condition requires an urethane and, if desired, urea and/or amide and/or biuret group content of 4 to 25 and preferably 6 to 15% by weight based on the weight of the isocyanate polyaddition product which contains 'onium salt groups. This means that the portion of component A amounts to 40 to 80% by weight referred to the weight of the complete isocyanate polyaddition product. Component A is preferably a polyether and/or a polyester.

The amount of 'onium salt groups present in the cationic isocyanate polyaddition products which are used according to the invention is determined by the requirement that the products must form, when in water, a solution, a sol or at least a finely divided stable dispersion in which the particles have an average particle diameter of less than $0.5\mu$ and preferably less than $0.3\mu$. In other words, the dispersions should show the Tyndall effect and a layer approximately 1 mm. thick should be translucent. Milky white coarsely dispersed latices are generally less suitable. On the other hand, the solubility of the isocyanate polyaddition products in water must not be too high in order to ensure sufficient water resistance of the textile finishes produced from them. The required conditions are fulfilled if the amount of 'onium salt groups present is between 8 and 250, preferably between 20 and 200, milliequivalents of 'onium salt groups for every 100 g. of cationic isocyanate polyaddition products.

The 'onium salt group contents which are used in each case depends on the nature of the isocyanate polyaddition product being used and particularly on the molecular weight of the product during its introduction into the aqueous phase and on the presence of other hydrophilic groups. If the average molecular weight of the cationic isocyanate polyaddition product is less than 6000, the amount of 'onium salt groups which are present is preferably 40 to 200 milliequivalents for every 100 g. of cationic isocyanate polyaddition product; in the case of dispersions of high molecular weight isocyanate polyaddition products, 8 milliequivalents of 'onium salt groups may be sufficient, and 100 milliequivalents are rarely exceeded.

Instead of the isocyanate polyaddition products which contain 'onium salt groups, mixtures of these cationic isocyanate polyaddition products with non-ionic isocyanate polyaddition products may be used provided the 'onium salt group content of the mixtures lies within the limits given for the cationic isocyanate polyaddition products, i.e. 8 to 250, and preferably 20 to 200, milliequivalents of 'onium salt for every 100 g. of the mixture of isocyanate polyaddition products.

Various methods may be employed for introducing the cationic polyurethane electrolytes into the aqueous phase. Higher molecular weight polyurethanes are advantageously prepared in organic solvents such as acetone, methylethyl ketone, ethyl acetate, methylene chloride or dimethyl formamide, at least in the last stage of their preparation. These solutions may be mixed with water without the use of special stirring devices or emulsifiers. In cases where the presence of the organic solvent in the finishing process is undesired, the solvent may subsequently to the mixing of the solution with the water be removed by distillation. The quantity of solvent is generally 10 to 200% of the weight of cationic isocyanate polyaddition product. Cationic isocyanate polyaddition products which can still be stirred when melted may also be mixed with water without the aid of solvents and may be converted in this way into aqueous solutions, sols or dispersions. If the salt-forming component (D) is an inorganic or an organic acid, 'onium salt formation may be postponed until the dilution with water, salt formation then being carried out by adding component (D) together with the water.

Whichever of these procedures is employed, one then obtains cationic isocyanate polyaddition products in the form of 20 to 80% solutions, sols or dispersions which are either purely aqueous or still contain organic solvents and which can be used directly for the preparation of the aqueous impregnating liquors.

These solutions, sols or dispersions of isocyanate polyaddition products which contain 'onium salt groups may also contain compounds which have a cross-linking action, such as formaldehyde, methylol compounds, polyfunctional alkylating agents, polyamines or polyepoxides.

One particular type of self-dispersible isocyanate polyaddition product containing 'onium salt groups which can be used according to the invention are cationic polyaddition products which have terminal carbonamide, thiocarbonamide, amidine and/or sulphonamide groups. These polyaddition products are obtained, for example, by the reaction of an isocyanate-group containing isocyanate polyaddition product with an urea, or by the reaction of a tertiary amino end group containing isocyanate polyaddition product with chloroacetamide. These cationic isocyanate polyaddition products having terminal carbonamide, thiocarbonamide, amidine and/or sulphonamide groups can be chain lengthened with formaldehyde or with formaldehyde derivatives such as N-methylol, N-methylolether or N-methylolacetate compounds, that means formaldehyde compounds as are usually used as crease-resistance agents, to form high molecular weight condensation products which are then cross-linked.

The sulphonium-containing or ammonium-containing isocyanate polyaddition products used in the textile finishing process according to the invention are preferably of a type obtained by the quaternization of sulphides such as thiodiglycol or amines such as pyridine or tributylamine with isocyanate polyaddition products which contain reactive halogen atoms. The isocyanate polyaddition products containing reactive halogen atoms used for this purpose are polyaddition products of the type obtained by reacting a prepolymer which contains 2 to 7% by weight of free isocyanate groups with a halocarboxylic acid or its amide, e.g. chloroacetic acid, bromoacetic acid or chloroacetamide, or with a haloalcohol such as chloroethanol or bromoethanol. The prepolymer in turn is prepared from hydroxyl-containing higher molecular weight polypropylene glycol ethers or liquid polyesters and a molar excess of an aliphatic diisocyanate. Such a product consists preferably of 40 to 80% by weight of a polypropylene glycol ether, 10 to 25% by weight of an aliphatic diisocyanate, 2 to 20% by weight of a compound of the formula $$Br—(CH_2)_n—X$$

wherein $n$ is a number from 1 to 5 or 6 and
X denotes a hydroxy, mercapto, carboxy or carbonamide group and 2 to 20% by weight of a tertiary amine and/or a sluphide, which may contain reactive hydrogen atoms, and optionally 1 to 10 or 20% by weight of a further quaternization agent and/or an acid.

The quantity of isocyanate polyaddition products containing 'onium salt groups in the processing liquors may vary within wide limits; 20 to 150 g. per litre of processing liquor has generally been found satisfactory.

To prepare the processing liquors for use according to the invention, the cationic isocyanate polyaddition products which, as explained above, may be undiluted or dissolved, emulsified or dispersed in water or in aqueous organic systems, are diluted with water to the desired concentration. It has frequently been found desirable for the stability of the liquor and its wetting ability if the liquor contains an addition of 1 to 50, and preferably 3 to 10%, by weight of surface active non-ionogenic or cationic active compounds, based on the cationic isocyanate poly-addition product. If surface active agents are added, preparation of the liquors is advantageously carried out by first preparing a slurry of the cationic isocyanate polyaddition product with the surface active compounds and then diluting this either by stirring water into it or by stirring it into water.

The following are given as examples of surface active non-ionic compounds: hydroxyethylation products of alkylphenols, fatty alcohols and fatty acids; examples of suitable cation active compounds are compounds of the type alkyl- or alkylaralkyl ammonium chlorides such as lauryl dimethylbenzylammonium chloride. These last-mentioned compounds may advantageously be used for imparting both a felt-free and a bactericidal finish, for example, to wool in a one-step process.

The aqueous liquors for use according to the invention may also contain the following additives:

(a) Salts which alter the pH of the liquor, such as sodium acetate, potassium acetate, sodium bicarbonate, sodium carbonate, sodium dihydrogen phosphate, disodium phosphate, tetrasodium phosphate or borax, triethanolamine, polyamines such as permethyldiethylene triamine and their acetates; these compounds are used in quantities of 1 to 10 g., preferably 5 to 6 g., per litre of liquor;

(b) Compounds which have a swelling or solubilizing effect, such as urea, dicyandiamide, formamide, dimethylformamide, dimethylacetamide, methanol, ethanol or isopropanol;

(c) Softeners or dispersions of polymers or copolymers based on vinyl or divinyl compounds, the addition of which improves the handle and abrasion resistance of the treated textile material.

Other textile finishing agents such as perfluoroalkyl compounds may also be added to the liquors used according to the invention in order to achieve other improving effects with the felt resistant and shrink resistant finish, e.g. a stain resistant finish.

It has been found advantageous, particularly when finishing mixed fabrics of wool and cotton, to add precondensates of synthetic resins, e.g. the dimethylol compounds of urea, of cyclic ureas and of ethylene, propylene, dihydroxyethylene and hydroxypropylene urea, and trimethylol, tetramethylol and hexamethylol compounds of melamine and dimethylol compounds of thiourea to the liquors used according to the invention in order to impart a finish to the cotton component of the fabric at the same time as to the wool component. In this case, the aqueous liquors will also contain additions of ammonium salts such as ammonium sulphate or ammonium nitrate or metal salts such as magnesium chloride or zinc nitrate, if desired in admixture with magnesium acetate, sodium acetate or ammonium acetate as catalysts for the synthetic resins. The quantities of catalyst may generally be reduced to half or three-quarters of the quantity which would normally be used.

Treatment of the textile material with the liquors according to the invention may be carried out either by an impregnating process or by an exhaustion process. Impregnation is generally carried out by immersing the textile material in the liquors and then squeezing off, or centrifuging off, the liquid. Alternatively, the textile material may be sprayed with the aqueous liquors. After treatment, the textile material is dried for 5 to 20 minutes at 90 to 100° C. and then, depending on the type of fibre material, it is cured for 5 to 20 minutes at 110 to 150° C.

For felt proofing wool, curing for 5 minutes at 120° C. is generally sufficient. When the textile material is treated with aqueous liquors which contain the 'onium compounds according to the invention and precondensates of synthetic resins, curing is carried out for 4 to 5 minutes at 130 or 150° C. Isocyanate polyaddition products which have a sufficiently high molecular weight provide a sufficient effect if the materials are dried above 50° C. and they require no curing afterwards. In general, a heat treatment in the temperature range of 50 to 150° C. preferably 120 to 150° C. has proved to be advantageous.

The textiles treated according to the invention may be dyed and printed after treatment without the dyeing process causing any felting of the wool. Furthermore pleating-effects fast to washing can be obtained on wool or textile materials containing wool by the 'onium group containing isocyanate polyaddition products to be used according to the invention.

It is already known to give a felt-proof and shrink-proof finish to textile materials made of wool, or of fibre materials which contain wool, by treating them with aqueous liquors which contain isocyanate-group containing isocyanate polyaddition products. The disadvantages of this finishing process lie in the difficulties involved in the preparation of the aqueous emulsions or dispersions. Emulsifying or dispersing isocyanate-group containing isocyanate polyaddition products in water must be carried out with special high speed stirrers. Furthermore, the liquors have only limited stability because the free isocyanate groups of the isocyanate polyaddition product used gradually react with water so that the liquors lose their effectiveness.

The disadvantages of the known process are overcome by means of self-dispersible isocyanate polyaddition products containing cationic groups which are used according to the invention since the reaction products used according to the invention are readily dispersible in water and the liquors obtained are stable for an unlimited length of time.

A surprising feature of the process according to the invention is that excellent finishing effects are obtained on textile materials made of wool or containing wool even when using isocyanate polyaddition products which are free from isocyanate groups.

EXAMPLE 1

A woollen fabric is impregnated with an aqueous liquor which contains:

100 g. of the sulphonium group containing isocyanate polyaddition product described below,
6 g. of sodium acetate, and
5 g. of urea per litre. This liquor was prepared by slowly stirring 800 g. of water into 100 g. of the polyaddition product and then adding a solution of 6 g. of sodium acetate and 5 g. of urea in 89 g. of water. The fabric is squeezed off to a weight increase of about 90%. It is then dried for 10 minutes at 100° C. and then cured for 5 minutes at 120° C.

The fabric treated according to the invention has a pleasant handle and an excellent shrink-proof finish which is resistant to washing.

| | Total shrinkage in percent [1] | | |
|---|---|---|---|
| | Warp, percent | Weft, percent | Remarks |
| A | −0.6 | −0.4 | Not felted, clear appearance of the fabric. |
| B | −12.8 | −9.5 | Severely felted. |

[1] After 5 machine washings at 60° C.

NOTE.—A = Fabric treated according to the invention; B = Untreated fabric.

The sulphonium-group containing isocyanate polyaddition product used was prepared as follows: 3000 g. of a branched polyether of average molecular weight 3000±200 and OH number 56±3 prepared from propylene oxide and trimethylolpropane were heated together with 535 g. of hexamethylene diisocyanate at 110° C. for 2 hours and then at 130 to 140° C. for 1½ hours.

1000 g. of an 80% (percent by weight) solution of the above reaction product (free isocyanate group content 3.9%) in ethyl acetate were reacted with 112 g. of bromoacetic acid at 30° C. for 20 hours. The carbon dioxide formed was continuously removed by intensive stirring. 132 g. of thiodiglycol were then added to the reaction product at room temperature and the mixture was then stirred for one hour.

EXAMPLE 2

A mixed fabric of 55% polyester fibres and 45% wool is impregnated by immersion in an aqueous liquor which contains per litre 100 g. of the sulphonium group containing isocyanate polyaddition product described in Example 1,
8 g. of the ethoxylation product of 1 mol of nonylphenol and 7 to 30 mols of ethylene oxide,
5 g. of sodium acetate and
5 g. of urea.

This liquor had been prepared as described in Example 1. The fabric is squeezed to a weight increase of about 80%. It is then dried for 10 minutes at 100° C. and then heated for 4 minutes at 130° C.

The fabric treated according to the invention has an excellent wash-resistant, dimensionally stable and non-felting finish.

| | Total shrinkage in percent [1] | | |
|---|---|---|---|
| | Warp, percent | Weft, percent | Remarks |
| A | −0.6 | −0.8 | Not felted, open fabric appearance. |
| B | −7.2 | −4.2 | Severely felted. |

[1] After 5 machine washings at 60° C.

NOTE.—A = Fabric treated according to the invention; B = Untreated fabric.

The aqueous liquor was prepared as follows: 100 g. of the sulphonium compound described in Example 1 were mixed with 8 g. of ethoxylation product and dissolved by slowly adding 800 g. of water and stirring. A solution of 6 g. of sodium acetate and 5 g. of urea in 81 g. of water was added to this solution.

EXAMPLE 3

A woollen fabric is impregnated with an aqueous liquor which contains per litre 90 g. of the sulphonium-group containing isocyanate polyaddition product described in Example 1,
5 g. of lauryl dimethylbenzyl ammonium chloride,
5 g. of sodium bicarbonate and
5 g. of urea.

The fabric is squeezed off to a weight increase of about 80% and is then dried for 10 minutes at 100° C. and cured for 10 minutes at 110° C.

The aqueous liquor was prepared as follows: 90 g. of the isocyanate polyaddition product described in Example 1 were treated with 10 g. of an aqueous solution of lauryl dimethylbenzyl ammonium chloride which had a concentration of 50% by weight, and the components were dissolved by stirring and slowly adding 700 g. of water, to the resulting solution was added a solution of 5 g. of sodium bicarbonate and 5 g. of urea in 190 g. of water.

The treatment imparts an excellent wash-resistant felt-free finish and dimensional stability to the fabric.

| | Total shrinkage in percent [1] | | |
|---|---|---|---|
| | Warp, percent | Weft, percent | Remarks |
| A | −0.6 | −0.4 | Not felted, open appearance of fabric. |
| B | −6.8 | −3.9 | Severely felted. |

[1] After 5 machine washings at 60° C.

NOTE.—A = Fabric treated according to the invention; B = Untreated fabric.

EXAMPLE 4

Knitted woollen samples are treated for 15 minutes at room temperature with an aqueous liquor at a ratio of 1:30, the liquor containing 1.7 g. of the sulphonium-group containing isocyanate polyaddition product described in Example 1 and 5 g. of sodium sulphate per litre.

The liquor is then slowly heated to 50° C. after the addition of 2 g. of permethyldiethylene triamine per litre of liquor and it is then maintained at this temperature for 20 minutes. The textile material is then freed of water by centrifuging, dried at 90° C. for 20 minutes and then cured at 120° C. for 5 minutes.

The treatment imparts an excellent wash resistant felt-free finish to the knitted samples, as shown in the following table:

PERCENT FELT SHRINKING SURFACE (TESTED ACCORDING TO IWS SPECIFICATION 7a)

|   | 30 minutes, percent | 60 minutes, percent |
|---|---|---|
| A | +5.7 | +0.2 |
| B | −26.7 | −40.2 |

NOTE.—A = Fabric treated according to the invention; B = Untreated textile material.

EXAMPLE 5

A mixed fabric of 70% wool and 30% rayon is impregnated with an aqueous liquor which contains per litre 100 g. of the sulphonium group containing isocyanate polyaddition product described in Example 1,
10 g. of the ethoxylation product of 1 mol of nonylphenol and 7 to 30 mols of ethylene oxide,
50 g. of dimethylol urea and
2 g. of ammonium sulphate.

This liquor was prepared as follows: 100 g. of isocyanate polyaddition product were mixed with 10 g. of ethoxylation product and dissolved by stirring and the addition of 500 g. of water. This solution was mixed with a solution of 50 g. of dimethylol urea and 2 g. of ammonium sulphate in 338 g. of water.

The fabric is squeezed off to a weight increase of about 90%, dried at 100° C. and then cured for 5 minutes at 130° C.

The textile material treated according to the invention has excellent dimensional stability and no longer has any tendency to felt when washed. The crease-resistance of the fabric is substantially improved, as indicated in the following tables:

| Total shrinkage in percent [1] | | |
|---|---|---|
| Warp, percent | Weft, percent | Remarks |
| A   −0.8 | ±0 | Unfelted, open fabric appearance. |
| B   −14.4 | −8.3 | Severely felted. |

| Dry crease angle [2] | | Wet crease angle [3] | |
|---|---|---|---|
| Warp, degrees | Weft, degrees | Warp, degrees | Weft, degrees |
| A   154 | 153 | 137 | 137 |
| B   135 | 138 | 99 | 104 |

[1] After 5 machine washings at 60° C.
[2] Tested according to DIN 53 890, sheet 1 (=AATCC-66-1959T).
[3] Tested according to DIN 53 890, sheet 2.

NOTE.—A = Fabric treated according to the invention; B = Untreated fabric.

EXAMPLE 6

A mixed fabric of 50% wool and 50% cotton is treated with an aqueous liquor which contains per liter 80 g. of sulphonium group containing isocyanate polyaddition product described in Example 1,
10 g. of ethoxylation product of 1 mol of nonylphenol and 7 to 30 mols of ethylene oxide,
60 g. of dimethylolhydroxyethylene urea and 3 g. of magnesium chloride.

The liquor had been prepared as follows: 80 g. of isocyanate polyaddition product were mixed with 10 g. of ethoxylation product and dissolved in 510 g. of water with stirring. To this solution was added a solution of 60 g. of dimethylolhydroxyethylene urea and 3 g. of magnesium chloride in 337 g. of water.

The fabric is squeezed off to a weight increase of about 100% and is then dried at 100° C. and cured for 5 minutes at 150° C.

The fabric treated according to the invention has excellent dimensional stability and no longer tends to felt when washed. In addition, excellent improvement in the crease-resistance is obtained in the fabric treated according to the invention.

| Total shrinkage in percent [1] | | |
|---|---|---|
| Warp, percent | Weft, percent | Remarks |
| A   −0.6 | −0.3 | Unfelted, open fabric appearance. |
| B   −8.9 | −9.7 | Felted. |

| Dry crease angle [2] | | Wet crease angle [3] | |
|---|---|---|---|
| Warp, degrees | Weft, degrees | Warp, degrees | Weft, degrees |
| A   141 | 146 | 140 | 148 |
| B   125 | 129 | 127 | 130 |

[1] After 5 machine washings at 60° C.
[2] Tested according to DIN 53 890, sheet 1 (=AATCC-66-1959T).
[3] Tested according to DIN 53 890, sheet 2.

NOTE.—A = Fabric treated according to the invention; B = Untreated fabric.

EXAMPLE 7

A wool fabric is impregnated with a liquor which contains per litre 100 g. of the sulphonium group containing isocyanate polyaddition product described below,
6 g. of the ethoxylation product of 1 mol of nonylphenol and 7 to 30 mols of ethylene oxide,
20 g. of isopropanol,
6 g. of potassium acetate and
5 g. of urea.

The fabric is then squeezed off to a weight increase of 80%, dried at 100° C and then cured for 5 minutes at 120° C.

The treatment imparts an excellent wash resistant felt-free finish and dimensional stability to the fabric.

| Total shrinkage in percent [1] | | |
|---|---|---|
| Warp, percent | Weft, percent | Remarks |
| A   −0.9 | −0.6 | Unfelted, open fabric appearance. |
| B   −15.8 | −9.7 | Severely felted. |

[1] After 5 machine washings at 60° C.

NOTE.—A = Fabric treated according to the invention; B = Untreated fabric.

The isocyanate polyaddition product used was prepared as follows: A solution of 77 g. of bromoacetic acid in 160 g. of ethyl acetate was added to 93 g. of hexamethylene diisocyanate. The reaction mixture was stirred for 3½ hours at 30 to 35° C. and 50 g. of a partly branched polyether which had a OH-number of 56±3 and a hydroxyl group content of 1.6 to 1.8% and which had been prepared from propylene glycol, trimethylol propane and propylene oxide were then added at a temperature of 50° C.

The reaction mixture was heated to 95° C. with stirring, maintained at this temperature for 3 hours and then heated for one hour at 105° C. It was then cooled to 35° C., 90 g. of thiodiglycol and 45 g. of water were added, and the reaction mixture was stirred at this temperature for one hour.

The treatment liquor was prepared as follows from the resulting sulphonium-group containing isocyanate polyaddition product:

100 g. of isocyanate polyaddition product were mixed with 6 g. of the ethoxylation product and 20 g. of isopropanol, and the mixture was diluted with 674 g. of water. A solution of 6 g. of potassium acetate and 5 g. of urea in 189 g. of water was added to this solution.

EXAMPLE 8

A woollen fabric is impregnated with a liquor which contains per litre 100 g. of the ammonium group containing isocyanate polyaddition product described below, 3 g. of lauryl dimethylbenzyl ammonium chloride,
10 g. of sodium acetate and
10 g. of urea.

The fabric is dipped in the aqueous liquor and squeezd off to a weight increase of 90%. It is then dried at 100° C. and cured at 110° C. for 10 minutes. The fabric is then bleached with hydrogen peroxide, washed with 2 g. per litre of a commercial detergent at 40° C. and dried.

The fabric treated according to the invention is resistant to washing and has no tendency to felt.

| | Total shrinkage in percent [1] | | |
|---|---|---|---|
| | Warp, percent | Weft, percent | Remarks |
| A | −0.7 | −0.6 | Unfelted, open fabric appearance. |
| B | −12.3 | −8.7 | Severely felted. |

[1] After 5 machine washings at 60° C.

NOTE.—A=Fabric treated according to the invention; B=Untreated fabric.

The ammonium group containing isocyanate polyaddition product used was prepared as follows: 3000 g. of a polyether of average molecular weight 3000 and hydroxyl number 56 prepared from propylene oxide and trimethylolpropane were heated with 535 g. of hexamethylene diisocyanate for 2 hours at 110° C. and then 1½ hours at 130° C. 90 g. of bromoacetic acid were introduced into a solution of 640 g. of the resulting prepolymer (free isocyanate content approximately 3.9%) in 160 g. of ethyl acetate. The reaction mixture was stirred at 35° C. for 20 hours, 70 g. of pyridine were then added and the reaction mixture was then stirred for one further hour at 30° C.

The treatment liquor was prepared from the resulting ammonium group containing isocyanate polyaddition product as follows: 6 g. of a 50% aqueous solution of lauryl dimethylbenzyl ammonium chloride were added to 100 g. of the ammonium compound and the mixture was diluted with 694 g. of water. A solution of 10 g. of urea and 10 g. of sodium acetate in 180 g. of water were added to the resulting solution.

EXAMPLE 9

A woollen fabric is treated with a liquor which contains per litre 100 g. of the sulphonium group containing isocyanate polyaddition product described below,
10 g. of an aqueous 50% solution of dimethylbenzyl ammonium chloride,
10 g. of sodium acetate and
5 g. of urea.

The fabric is squeezed off to a liquor uptake of about 90% and was then dried.

The fabric treated according to the invention is characterized by a pleasant handle. In addition, a good, wash-resistant felt-free finish is obtained, as indicated in the following table:

| | Total shrinkage in percent [1] | | |
|---|---|---|---|
| | Warp, percent | Weft, percent | Fabric appearance |
| A | −2.2 | −0.8 | Unfelted. |
| B | −6.3 | −5.3 | Severely felted. |

[1] After 3 machine washings at 60° C.

NOTE.—A=Fabric treated according to the invention; B=Untreated fabric.

The sulphonium compound used was prepared as follows: 240 g. of the 80% solution of the prepolymer described in Example 8 (free isocyanate group content: 3.9%) in ethyl acetate are reacted with 13 g. of 1,2-dibromosuccinic acid for 24 hours at room temperature. 30 g. of thiodiglycol are then added and the reaction mixture is stirred for another 2 hours at room temperature.

The treatment liquor was prepared as follows from the resulting sulphonium group containing isocyanate polyaddition product: 100 g. of the sulphonium compound were treated with 10 g. of a 50% aqueous solution of dimethylbenzyl ammonium chloride and diluted with 690 g. of water with stirring. To the resulting solution was added a solution of 10 g. of sodium acetate and 5 g. of urea in 185 g. of water.

EXAMPLE 10

A woollen fabric is impregnated with an aqueous liquor which contains per litre 200 g. of a 20% aqueous dispersion of an ammonium group containing isocyanate polyaddition product described below and
10 g. of urea.

The fabric is squeezed off to a weight increase of about 100%, dried for 10 minutes at 100° C. and then heated for 5 minutes at 120° C.

A good, wash-resistant felt-free finish is obtained on the fabric by this treatment.

| | Total shrinkage in percent [1] | |
|---|---|---|
| | Warp, percent | Weft, percent |
| A | −4.6 | −2.1 |
| B | −7.2 | −4.1 |

[1] After 3 machine washings at 60° C.

NOTE.—A=Fabric treated according to the invention; B=Untreated fabric.

The 20% dispersion of amonium group containing isocyanate polyaddition product used was prepared as follows: 548 g. of a linear mixed polyester of molecular weight 1700 which contains hydroxyl end groups and which had been prepared from adipic acid, hexane-1,6-diol and neopentyl glycol in the molar ratio of 15:11:6, 274 g. of a polyester of adipic acid and ethylene glycol of molecular weight 2000, and 22.3 g. of butane-1,4-diol are mixed and then stirred together with a mixture of 104.3 g. of 1,6-hexamethylene dissocyanate and 51.4 g. of the biuret diisocyanate

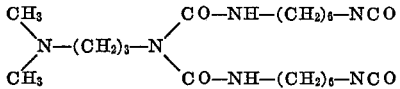

at 80° C. The homogeneous melt which rapidly becomes viscous is poured out on metal sheets and cured for 12 hours at 100° C. The resulting solid isocyanate polyaddition product which contains tertiary amino groups is granulated and dissolved in tetrahydrofuran to form a 40% solution. The solution is neutralized with 85% phosphoric acid. Water is added and the tetrahydrofuran is distilled off. A finely divided 20% aqueous dispersion of an isocyanate polyaddition product which contains ammonium groups is obtained.

If instead of the 20% aqueous dispersion described above an equal quantity of a 35% aqueous dispersion described below is used, a fabric with equally good finish is obtained.

The 35% aqueous dispersion used was obtained as follows: A mixture was prepared from 80% of the above described granulated isocyanate polyaddition product which contains tertiary amino groups and 20% of the non-ionic polyurethane described below which is not capable of 'onium salt formation. The mixture was dissolved in tetrahydrofuran and after neutralization with phosphoric acid, it was dispersed by stirring water into the solution. 2%, based on the solids content, of a ethoxylation product of 1 mol of nonylphenol and 7 to 30 mols of ethylene oxide were then added to the 35% aqueous dispersion to increase the stability of the liquor.

The non-ionic isocyanate polyaddition product which is not capable of 'onium salt formation was prepared as follows: 851.3 g. of a hydroxyl group containing linear mixed polyester of molecular weight 1700 prepared from adipic acid, hexane-1,6-diol and neopentyl glycol in the molar ratio of 15:11:6, 20.9 g. of butane-1,4-diol and 127 g. of hexamethylene-1,6-diisocyanate were stirred at 100° C. and the viscous melt was poured out on metal sheets and cured at 120° C. for 24 hours.

EXAMPLE 11

A woollen fabric is impregnated with an aqueous liquor which contains per litre 112 g. of the sulphonium group containing isocyanate polyaddition product described below,
10 g. of the ethoxylation product of 1 mol of nonylphenol and 7 to 30 mols of ethylene oxide and
10 g. of sodium acetate.

The fabric is squeezed off to a weight increase of about 90%, dried for 10 minutes at 100° C. and heated for 5 minutes at 120° C.

A good, wash-resistant felt-free finish of the fabric is achieved by the treatment.

| | Total shrinkage in percent [1] | | |
|---|---|---|---|
| | Warp, percent | Weft, percent | Remarks |
| A | −1.6 | −0.2 | Unfelted. |
| B | −6.8 | −4.6 | Severely felted. |

[1] After 3 machine washings at 60° C.

NOTE.—A=Fabric treated according to the invention; B=Untreated fabric.

The sulphonium group-containing isocyanate polyaddition product used was prepared as follows: The procedure was the same as that employed in Example 1 for the preparation of the sulphonium group containing isocyanate polyaddition product except that instead of 132 g. of thiodiglycol, 142 g. of a polythioether of OH number 100 prepared from thiodiglycol and triethylene glycol were stirred into the mixture.

The treatment liquor was prepared as described in the previous examples.

EXAMPLE 12

A woollen fabric is treated with an aqueous liquor which contains 200 g. per litre of the polyurethane dispersion described below. The fabric was dipped in the aqueous liquor and squeezed off to a liquor uptake of about 100%. It is dried, then impregnated with a solution of 10 g. of sodium bicarbonate and 10 g. of urea in one litre of water, again dried and cured at 120° C. for 5 minutes. The tendency of the fabric treated according to the invention to felt after washing is distinctly less than that of untreated fabrics.

| | Total shrinkage in percent [1] | |
|---|---|---|
| | Warp, percent | Weft, percent |
| A | −4.6 | −0.8 |
| B | −10.2 | −10.6 |

[1] After 5 machine washings at 60° C.

NOTE.—A=Treated according to the invention; B=Untreated.

The dispersion of the ammonium group containing isocyanate polyaddition product was prepared as follows: 500 g. (0.298 mol) of a linear mixed polyester of molecular weight 1700 which contains hydroxyl end groups and which was prepared from adipic acid, hexane-1,6-diol and neopentyl glycol in the molar ratio of 15:11:6, 50 g. of N-methyldiethanolamine and 50 g. of urea were mixed with 194 g. of hexane-1,6-diisocyanate at 70° C. The temperature of the melt rose to 137° C. After the addition of 19.6 g. of monochloroacetamide, the reaction mixture was stirred at this temperature for 30 minutes. 12.6 g. of glacial acetic acid dissolved in 150 cc. of water, 100 g. of 30% formaldehyde solution and 1200 g. of water were then added successively drop by drop at 115 to 195° C., the glacial acetic acid being added in the course of 25 minutes, the formaldehyde solution in the course of 14 minutes and water in the course of 80 minutes. The resulting opaque thick sol was then adjusted to pH 4 with tartaric acid. The solids content of the sol was 35%.

EXAMPLE 13

The procedure is the same as described in Example 1 only instead of using 132 g. of thiodiglycol, only 66 g. of thiodiglycol are used for preparing the sulphonium group containing isocyanate polyaddition product. Owing to the low sulphonium group content, the product is more difficult to disperse than the isocyanate polyaddition product of Example 1, but the aqueous liquor has equally good stability. The fabric treated according to the invention is distinguished by its pleasing handle and has an excellent wash resistant non-felting finish.

| | Total shrinkage in percent [1] | | |
|---|---|---|---|
| | Warp, percent | Weft, percent | Remarks |
| Treated | −1.1 | −0.8 | No felted, clear fabric appearance. |
| Untreated | −12.9 | −9.3 | Severely felted. |

[1] After 5 machine washings at 60° C.

EXAMPLE 14

A woollen fabric is impregnated by dipping into an aqueous liquor which contains per litre 100 g. of the sulphonium group-containing polyisocyanate polyaddition product,
15 g. of hexamethylene tetramine,
5 g. of urea,
10 g. of the ethoxylation product of 1 mol nonylphenol and 30 mols of ethylene oxide.

The fabric is squeezed off to a weight increase of about 90% and dried for 10 minutes at 90° C. Then the fabric either at once or after any storage, e.g. after two months, is pressed in pleats for 15 seconds at 130° C. by means of a steam press and subsequently cured for 15 minutes at 120° C.

The fabric treated in this manner is outstandingly felt-free finished and has pleats which are excellently resistant to washing.

EXAMPLE 15

A woollen fabric is impregnated on a foulard with an aqueous liquor which contains per litre 100 g. of the ammonium group-containing isocyanate polyaddition product described below
10 g. of the ethoxylation product of 1 mol nonylphenol and 10 to 20 mols of ethylene oxide,
5 g. of sodium acetate,
5 g. of urea then squeezed to a weight increase of 90%, dried for 10 minutes at 100° C. and subsequently cured for 5 minutes at 120° C.

By this treatment a good wash-resistant, felt-free finish and a good dimensional stability of the fabric is achieved.

Shrinkage of area in percent after 5 machine washings at 60° C.—below 3%: Fabric appearance—non felted, open fabric appearance. In comparison with it a non-treated fabric shows a shrinkage of area of more than 20% and is severely felted.

The ammonium group-containing isocyanate polyaddition product used was prepared as follows:

250 g. of polyester of molecular weight 1700 and which had been prepared from adipic acid, hexanediol-1,6 and neopentyl glycol in a molar ratio of 15:11:6 were heated with 17 g. N-methyl-diethanolamine and 73 g. hexamethylene diisocyanate to 140° C. After the exothermic reaction starting at this temperature had ceased 54 g. of bromoethanol were added to the reaction mixture at 60° C. Subsequently the reaction mixture was stirred at 60 to 70° C. until all NCO–groups had reacted; then to the reaction mixture there were added successively with stirring 5 g. of the ethoxylation product of 1 mol nonylphenol and 10 to 20 mols ethylene oxide, 1200 g. of water and 30 g. of a 30% by weight aqueous formaldehyde solution. There was obtained a thinly liquid 22% aqueous polyurethane-latex. An equivalently finished woollen fabric was obtained, when instead of the ammonium group-containing isocyanate polyaddition product used the same amount of one of the ammonium group-containing isocyanate polyaddition products A, B, C or D described below was used.

Product A 294 g. of a polypropylene etherglycol of molecular weight 2000 were reacted with 73 g. hexamethylene diisocyanate by heating for 1 hour at 130 to 140° C. To the prepolymer such obtained there were added 17 g. of N-methyl-diethanolamine. After the exothermic reaction had ceased the reaction mixture was cooled to 60° C., subsequently were added first the solution of 17 g. dimethyl sulphate dissolved in 20 g. glycolmonomethyl-ether acetate and then 40 g. of bromoacetic. Then the reaction mixture was stirred at 60° C. to 70° C. until all NCO-groups had reacted; to the reaction product obtained there were added with stirring successively 5 g. of the ethoxylation product of 1 mol nonylphenol and 10 to 20 mols ethylene oxide, 2000 g. of water and 30 g. of 30% by weight of aqueous formaldehyde solution. Product A was obtained in the form of a thinly liquid 18% aqueous polyurethane sol.

Product B

Product B was prepared as product A, with the only change that instead of 40 g. of bromoacetic acid there were used 36 g. of bromoethanol.

Product C 250 g. of a polyester of molecular weight of 1700 and which had been prepared from adipic acid, hexanediol-1,6 and neopentyl glycol in a molar ratio of 15:11:6, were heated with 23 g. of N-butyldiethanolamine and 73 g. of hexamethylene diisocyanate to 140° C. After the exothermic reaction starting at this temperature had ceased 36 g. of bromoethanol were added to the reaction mixture at 60° C. Subsequently the reaction mixture was stirred at 60 to 70° C. until all NCO-groups had reacted. Then there were added to the reaction product with stirring the solution of 11.5 g. of 85% per weight phosphoric acid in 100 g. of water and subsequently 5 g. of the ethoxylation product of 1 mol nonylphenol and 10 to 20 mols ethylene oxide, 800 g. of water and 30 g. of 30% aqueous formaldehyde solution. Product C is obtained in the form of 30% fluid opalescent polyurethane-sol.

Product D 294 g. of polypropylene ether glycol of molecular weight 2000 were reacted with 73 g. of hexamethylene diisocyanate by heating for 1 hour to 140° C. To the prepolymer such obtained there were added 23 g. of N-butyl-diethanolamine. After the exothermic reaction had ceased there were added to the reaction mixture at 60° C. 36 g. of bromoethanol. Subsequently the reaction mixture was stirred at 60 to 70° C. until all NCO-groups had reacted. To the reaction product such obtained there were added with stirring the solution of 11.5 of 85% by weight phosphoric acid in 100 g. of water and subsequently 5 g. of the ethoxylation product of 1 mol nonylphenol and 10 to 20 mols ethylene oxide, 1400 g. of water and 30 g. of 30% aqueous formaldehyde solution.

EXAMPLE 16

A woollen fabric is impregnated on a foulard with an aqueous liquor which contains per litre 100 g. (a) respectively 50 g. (b) of the ammonium-group-containing isocyanate polyaddition product I,
10 g. (a) respectively 5 g. (b) of the ethoxylation product of 1 mol nonylphenol and 10 to 20 mols ethylene oxide,
5 g. of sodium acetate and
5 g. of urea.

The fabric is then squeezed to a weight increase of 90%, dried at 100° C. and subsequently cured for 5 minutes at 120° C.

By this treatment an excellent wash-resistant antifelt finish and dimensional stability of the fabric is achieved.

| | Shrinkage of area at 60° C. (in percent) after— | | Felting at 60° C. after— | |
|---|---|---|---|---|
| | 5 machine washings | 10 machine washings | 5 machine washings | 10 machine washings |
| (a) | Below 1 | 1.6 | No felting | No felting. |
| (b) | Below 3 | 4.0 | do | Slight felting. |

The ammonium-group-containing isocyanate polyaddition product used was prepared as follows: 250 g. of a polyester of molecular weight of 2000 which had been prepared from adipic acid, hexanediol-1,6 and neopentyl glycol in a molar ratio of 15:11:6 were heated with 17 g. of N-methyl-diethanolamine, and 69 g. hexamethylene diisocyanate to 90–110° C. until the exothermic reaction had ceased. The reaction mixture was cooled to 50° C. and then there were added firstly the solution of 18 g. of dimethyl sulphate in 20 g. of glycol-monomethyl-ether-acetate and subsequently 36 g. of 2-bromoethanol. Then the reaction mixture was stirred at 80–85° C. until all NCO-groups had reacted. Then there were added to the reaction product successively with stirring 40 g. of glycol-monomethyl-ether-acetate, 5 g. of the ethoxylation product of 1 mol nonylphenol and 10 to 20 mols ethylene oxide, 1000 g. of water and after cooling to room temperature 30 g. of 30% aqueous formaldehyde solution. There was obtained a thinly liquid 26% opalescent polyurethane sol.

An equivalently finished fabric was obtained, when instead of the ammonium-group-containing isocyanate polyaddition product I the same amounts [100 g. (a) respectively 50 g. (b)] of the ammonium-group-containing isocyanate polyaddition products II or III were used. Product II was prepared as product I with the only change that instead of the 17 g. of N-methyl-diethanolamine there were used 23 g. of N-butyl-diethanolamine.

The examination of the fabric finished with product II gave the following result:

| | Shrinkage of area at 60° C. (in percent) after— | | Felting at 60° C. after— | |
|---|---|---|---|---|
| | 5 machine washings | 10 machine washings | 5 machine washings | 10 machine washings |
| (a) | Below 1 | 1.4 | No felting | No felting. |
| (b) | Below 3 | 4.2 | do | Slight felting. |

In comparison with that a non treated fabric shows a shrinkage of area of more than 20% after 5 machine washings at 60° C., and more than 30% after 10 machine washings and is strongly felted.

Product III was prepared as follows:

250 g. of polyester of molecular weight of 1700 which had been prepared from adipic acid, hexanediol-1,6 and neopentyl glycol in a molar ratio of 15:11:6 were heated with 17 g. of N-methyl-diethanolamine and 73 g. of hexamethylene diisocyanate to 140° C. After the exothermic reaction starting at this temperature had ceased, firstly the solution of 17 g. of dimethyl sulphate in 20 g. glycolmonomethyl-ether-acetate and then 36 g. of bromoethanol were added to the reaction mixture at 60° C. Subsequently the reaction mixture was stirred at 60 to 70° C. until all NCO-groups had reacted, then were added to the reaction mixture successively with stirring 5 g. of the ethoxylation product of 1 mol nonylphenol and 10 to 20 mols ethylene oxide, 1200 g. water and 30 g. of 30% aqueous formaldehyde solution. Product III was obtained in the form of a 20% thinly liquid polyurethane-sol.

The examination of the fabric treated with product III gave the following result:

| | Shrinkage of area at 60° C. (in percent) after— | | Felting at 60° C. after— | |
|---|---|---|---|---|
| | 5 machine washings | 10 machine washings | 5 machine washings | 10 machine washings |
| (a) | 1.6 | 2.4 | No felting | No felting. |
| (b) | Below 3 | 4.2 | ___do___ | Slight felting. |

We claim:
1. A process for finishing textile material containing wool fibers which comprises treating said textile material with an aqueous liquor containing a self-dispersible isocyanate polyaddition product containing an onium salt group and being free of isocyanate groups, followed by drying the thus treated textile material, wherein said product is a reaction product of:
 (a) a compound of molecular weight from 300 to 10,000 which contains at least two hydroxyls, at least two carboxy, or at least one hydroxyl and one carboxyl group;
 (b) a polyisocyanate
 (c) a compound which contains
   (1) at least one group capable of onium salt formation, and
   (2) at least one group which is reactive with an isocyanate group
 (d) a compound which forms onium salts with the onium forming group (c)(1).
2. The process of claim 1 wherein said onium salt group is the reaction product of an alkyl chloride or an alkyl bromide with an amine or a sulphide.
3. The process of claim 1 wherein 40 to 80% by weight of said isocyanate polyaddition product containing an onium salt group is derived from a polyether, a polyester, or a mixture of a polyether and a polyester.
4. The process of claim 1 wherein said isocyanate polyaddition product containing an onium salt group contains 8 to 250 milliequivalents of said onium salt group per 100 grams polyaddition product.
5. The process of claim 4 wherein the amount of said onium salt group is 20 to 200 milliequivalents.
6. The process of claim 1 wherein said isocyanate polyaddition product containing an onium salt group comprises 40 to 80% by weight of a polypropylene glycol ether; 10 to 25% by weight of an aliphatic diisocyanate; 2 to 20% by weight of a compound of the formula

$$Br-(CH_2)_n-X$$

wherein $n$ is a number from 1 to 5 and X is —OH, —SH, —COOH, or CONH$_2$; 2 to 20% by weight of a tertiary amine, a sulphide, or a mixture of a tertiary amine and a sulphide; and 1 to 20% by weight of a quaternization agent, an acid, or a mixture of a quaternization agent and an acid.
7. The process of claim 1 wherein said aqueous liquor additionally contains formaldehyde, n-methylol compounds, or reaction products of formaldehyde and an N-methylol compound.

References Cited
UNITED STATES PATENTS 2,173,029  9/1939  Waltmann et al. _____ 8—116.2
3,084,019  4/1963  Whitfield et al. ____ 117—141 X WILLIAM D. MARTIN, Primary Examiner T. G. DAVIS, Assistant Examiner U.S. Cl. X.R.

8—127.6, 128 R; 117—138.8 F, 139.4, 139.5 A, 139.5 CQ, 143 A, 161 KP